(12) United States Patent
Eaton (10) Patent No.: US 6,598,306 B2
(45) Date of Patent: Jul. 29, 2003

(54) SELF-LOADING SPATIAL REFERENCE POINT ARRAY

(76) Inventor: Homer L. Eaton, Suite 108A, 300 CVD, #347, Carlsbad, CA (US) 92008

(*) Notice: Subject to any disclaimer, the term of this patent is extended or adjusted under 35 U.S.C. 154(b) by 0 days.

(21) Appl. No.: 09/836,954

(22) Filed: Apr. 17, 2001

(65) Prior Publication Data

US 2003/0066202 A1 Apr. 10, 2003

(51) Int. Cl.$^7$ .................................................. G01B 5/03
(52) U.S. Cl. ............................... 33/503; 33/502; 33/562
(58) Field of Search ............................. 33/1 BB, 502, 33/503, 549, 551, 553, 600, 608, 613, DIG. 1, 562

(56) References Cited

U.S. PATENT DOCUMENTS

| | | | | |
|---|---|---|---|---|
| 3,209,462 A | * | 10/1965 | Harford ........................ | 33/613 |
| 3,425,134 A | * | 2/1969 | Christensen .................. | 33/503 |
| 3,463,479 A | * | 8/1969 | Hennessey .................... | 33/549 |
| 3,537,697 A | * | 11/1970 | Davis .......................... | 33/549 |
| 3,723,928 A | * | 3/1973 | Blakey et al. ........... | 33/DIG. 1 |
| 3,982,837 A | * | 9/1976 | Cummins .................... | 73/1.79 |
| 4,442,607 A | * | 4/1984 | Sakata et al. ................. | 33/503 |
| 4,549,359 A | * | 10/1985 | Hense et al. .................. | 33/600 |
| 4,551,919 A | * | 11/1985 | Sakata et al. ................. | 33/503 |
| 4,982,504 A | * | 1/1991 | Soderberg et al. ............. | 33/502 |
| 5,187,874 A | * | 2/1993 | Takahashi et al. ............ | 33/502 |
| 5,611,147 A | * | 3/1997 | Raab ........................... | 33/503 |
| 5,829,148 A | * | 11/1998 | Eaton .......................... | 33/503 |
| 6,023,850 A | * | 2/2000 | Trapet ......................... | 33/502 |
| 6,298,572 B1 | * | 10/2001 | McAuley ..................... | 33/503 |
| 6,317,991 B1 | * | 11/2001 | Rinn ........................... | 33/503 |

* cited by examiner

Primary Examiner—G. Bradley Bennett
(74) Attorney, Agent, or Firm—Henri J. A. Charmasson; John D. Buchaca (57) ABSTRACT

An assemblage of reference points arranged in a distorted pattern of rows and columns over a planar surface is used to precisely establish the coordinates of a particular situs on said surface by determining the location between said situs in relation to three of said reference points. The array is particularly useful in ascertaining the reference location of a swiveling coordinate measuring arm or other such spatial measuring device. A three-dimensional reference point array can be constructed from a similarly distributed matrix of reference points arranged in orthogonally-oriented layers of rows and columns. Positioning the probe of the measuring device over three closely located reference points is sufficient to automatically load the exact coordinates of the measuring device location into an associated data processing system.

26 Claims, 9 Drawing Sheets

SELF-LOADING SPATIAL REFERENCE POINT ARRAY

FIELD OF THE INVENTION

This invention relates to spatial measurement devices and to coordinate grid patterns used as reference in connection with certain types of spatial measurement, and more particularly to reference point arrays used in connection with swiveling, coordinate measuring arms of the type disclosed in my U.S. Pat. No. 5,829,148 issued Nov. 3, 1998, which patent is incorporated by reference in this specification.

BACKGROUND OF THE INVENTION

A swiveling, spatial coordinate measuring arm has a limited reach in any direction of typically 1,500 mm, When taking measurements upon a large work piece such as an automobile, the arm must be moved to an number of locations. These locations must be precisely identified in reference to a large, volumetric coordinate system having a singular origin, also known as a global coordinate system. One of the most common and most practical methods of achieving global measurements with an articulated arm of limited reach is to define the location of the arm in relation to three known points in a surrounding reference grid or matrix. Each reference point on the grid or matrix carries a unique identification. Every time the operator moves the arm to a new location, the tip of the arm probe is successively positioned upon three identified points on the grid or matrix, each time the operator manually enters into the associated data processing system the unique identification of each reference point, the data processing system uses the three measurements to calculate the exact position in the arm. The coordinates of that position are then taken into account when determining the result of future measurements in reference to the global coordinate system. The manual entry by an operator of the three reference point identifications is not only time consuming, but is subject to human errors. Indeed, in a work environment, the labeling of a reference point identification may be difficult to read due to poor lighting conditions or obstruction by dust or debris. A single digit error in manipulating an entry keypad or keyboard can yield erroneous measurements.

This invention results from an attempt to eliminate the above-described weakness in the use of a swiveling spatial coordinate measuring arm or other similar spatial measuring devices on large work pieces.

SUMMARY OF THE INVENTION

The principal and secondary objects of the instant invention are to optimize the use of a swiveling, spatial coordinate measuring arm or similar spatial measurement device having a limited reach when making measurements over a large work piece that requires relocation of the measuring instrument, by providing a reference grid or matrix pattern whereby the displacement or relocation of the measuring instrument is automatically loaded into the associated data processing system through a simple maneuver which does not require any kind of human operation subject to human error; and to provide a new type of spatial reference pattern for use in these and other types of spatial measurements.

These and other valuable objects are achieved by laying out over the entire workplace, reference points in a distorted pattern of row and columns in which any triangle defined by joining three closely located reference points is unlike any other such triangle found anywhere else within the overall pattern. Consequently, in order to precisely determine the exact position of a measuring device after its relocation within the work space, it suffices to measure the positions of three closely spaced reference points. From the results of those three measurements, the associated data processing system can easily calculate the exact situs where the measuring device is positioned within a global coordinate system and offset all measurements accordingly.

DESCRIPTION OF THE PREFERRED EMBODIMENT OF THE INVENTION

Figure 1:
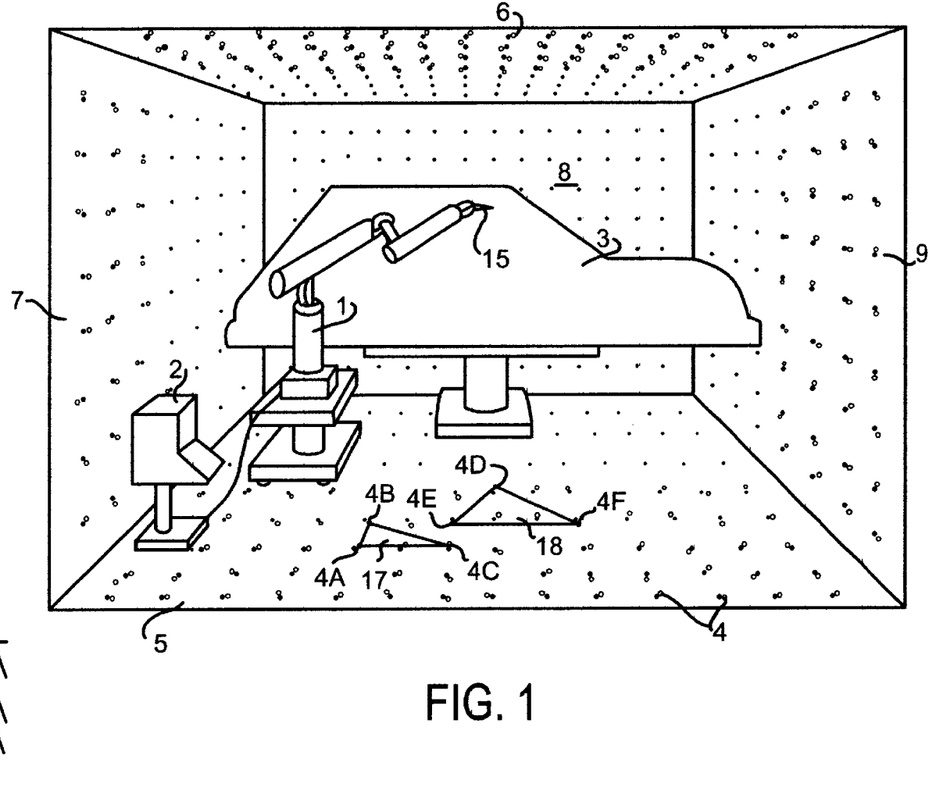
FIG. 1 is a perspective view of a work site equipped with a self-loading reference pattern according to the invention.

Referring now to the drawing, there is shown in FIG. 1, an examplary work shop environment in which a swiveling, spatial coordinate measuring arm 1 and its associated data processor 2 are used to conduct measurements on a three-dimensional work piece 3, in this case, an automobile body. A coordinate pattern of reference points or benchmarks 4 is permanently applied to the floor 5, ceiling 6 and surrounding walls 7–9 of the work room. The reference points are distributed and spaced apart in such a way that three of those points are always within the reach of the measuring arm 1 no matter at what location or situs the arm is positioned. On each wall, floor or ceiling, the reference points are arranged in a pattern of rows and columns that do not follow exactly linear and symmetric coordinate lines such as the one shown in dotted line in the drawing. Instead, the reference points are laid out in a distorted pattern that yields some important advantages as will be explained below.

Figure 2:
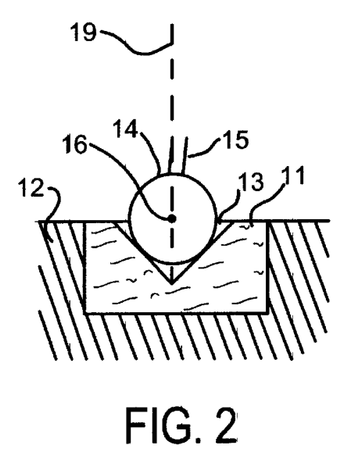
FIG. 2 is a cross-sectional view of the reference point layout.

As illustrated in FIG. 2, each benchmark 4 consists of a small slab 11 permanently embedded into the surface layer 12 of a floor, wall or ceiling. In the exposed surface of the slab, a conical cavity 13 is dimensioned to intimately nest or accommodate a ball 14 mounted on the tip 15 of the arm measuring probe. The cavity is shaped and dimensioned so that when the ball 14 is inserted, the center 16 of the ball lies at the reference point on the axis 19 of the cavity. An obviously equivalent version of the reference point would use a spherical or hemispherical benchmark to be contacted by a concavely conical probe tip.

The reference points are distributed such that a triangle 17 defined by a first set of three of said points 4A, 4B and 4C which are located within a defined proximity from one another, differs from any other triangle 18 defined by any second set of three of said points providing that said first and second sets have not no more than two reference points in common. Consequently, the distances and orientations from any location or situs within the work space where the measuring instrument is located to the first set of three points defining the first triangle 17 differ from the distances and orientations from said situs to any other set of points defining a second triangle 18 anywhere else in the whole coordinate pattern. Accordingly, the location coordinates of that situs can be accurately derived from measurements of the positions of any three reference points located within a defined proximity to one another. This defined proximity may consist of reference points defining a two-by-two sub-array, and preferably, may consist of reference points defining a three-by-three sub-array. In the case where different layers of planes of reference point grids are used such as in the example described above where the grid patterns on the walls are orthogonally oriented in relation to those on the floor and ceiling, the required proximity of the triangle-forming reference point may consist of three-dimensional two-by-two-by-two or three-by-three-by-three sub-arrays.

Figure 3:
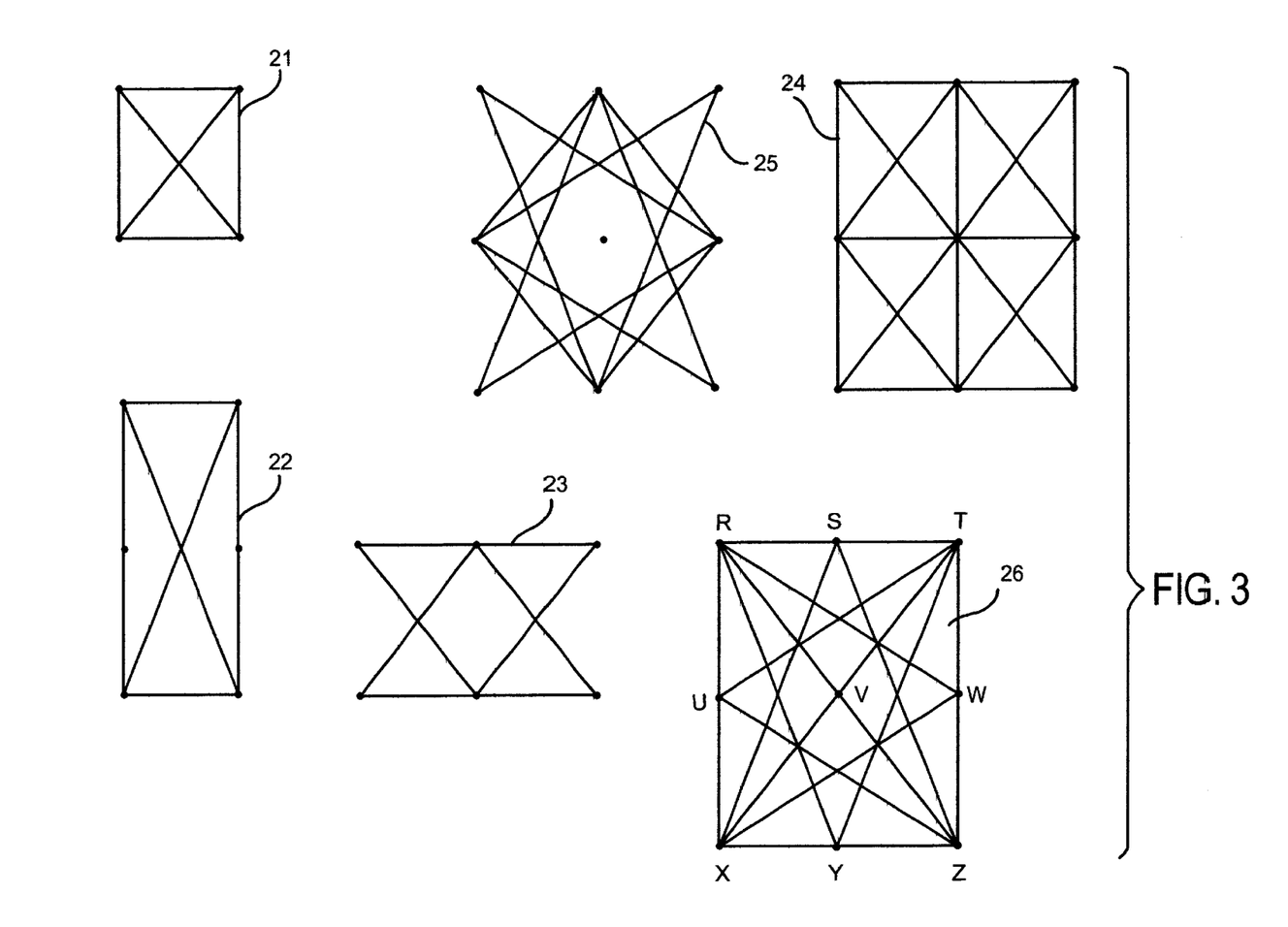
FIG. 3 is a map of possible triangular configurations.

FIG. 3 illustrates, in top plan views, all the possible triangular configurations that can be formed by joining three reference points within those sub-arrays. Four triangular configurations 21 can be found in a two-by-two sub-array.

When the sub-array is expanded to a two-by-three format, the number of triangular configurations is not only doubled, but six additional configurations 22 and 23 are possible; for a total of fourteen configurations.

In a three-by-three sub-array, there first is the same number of triangular configurations found in a two-by-two array times four 24; that is sixteen configurations. Moreover, there is also the same six additional configurations found in a two-by-three array times four; that is forty-six more configurations Finally, there are twelve triangular configurations 25 and 26 that extend over more than one two-by-three sub-arrays. Thus, eighty-four triangular configurations can be found in a three-by-three sub-array.

In a cubical three-by-three-by-three matrix, the number of triangular configurations is 2,268 assuming that the sharp-angle configurations 26 are avoided. The number of configurations that must be uniquely implemented can be dramatically reduced in that case by requiring that four closely spaced apart reference points be measured, that is, that four points defining a pyramid rather than a triangle be used. It should be understood that, in the case of a three dimensional sub-array, any two points of a triangle can be at the same or different level. In practice, it has been found convenient to avoid selecting three reference points that create a triangle having a very sharp angle. The use of such a sharp triangle may affect the precision of the measurement. For instance, in the set 26 of eight configurations that occupy more than a two-by-three sub-array, sharp triangles result from joining the following sets of points R Y Z, R W Z, T U X, T Y X, Z S T, Z U R, W T and XUT. These triangles would be avoided. This would have little effect on the usefulness of the reference pattern since there are plenty of other triangles within the same space that can be advantageously utilized.

It should also be noted that although the distortion of the grid pattern is preferably accomplished in a two dimensional manner, that is in the single plane, the deviation of any reference point from the location where it should be, if positioned in a regular coordinate grid, can be implemented in any direction that in three dimensions, if necessary.

The construction of a distorted coordinate reference point array is accomplished by successively calculating the distortion to be applied to the fourth and subsequent reference points through a trial and error method. An arbitrary amount of distortion is selected then all the triangles that can be formed from that reference point are checked for symmetry with any other triangle which could possibly be formed by joining any three points in the array that have been already offset. This determination process can be conveniently accomplished with the use of relatively simply computer programs as illustrated by the following example.

Figure 4:
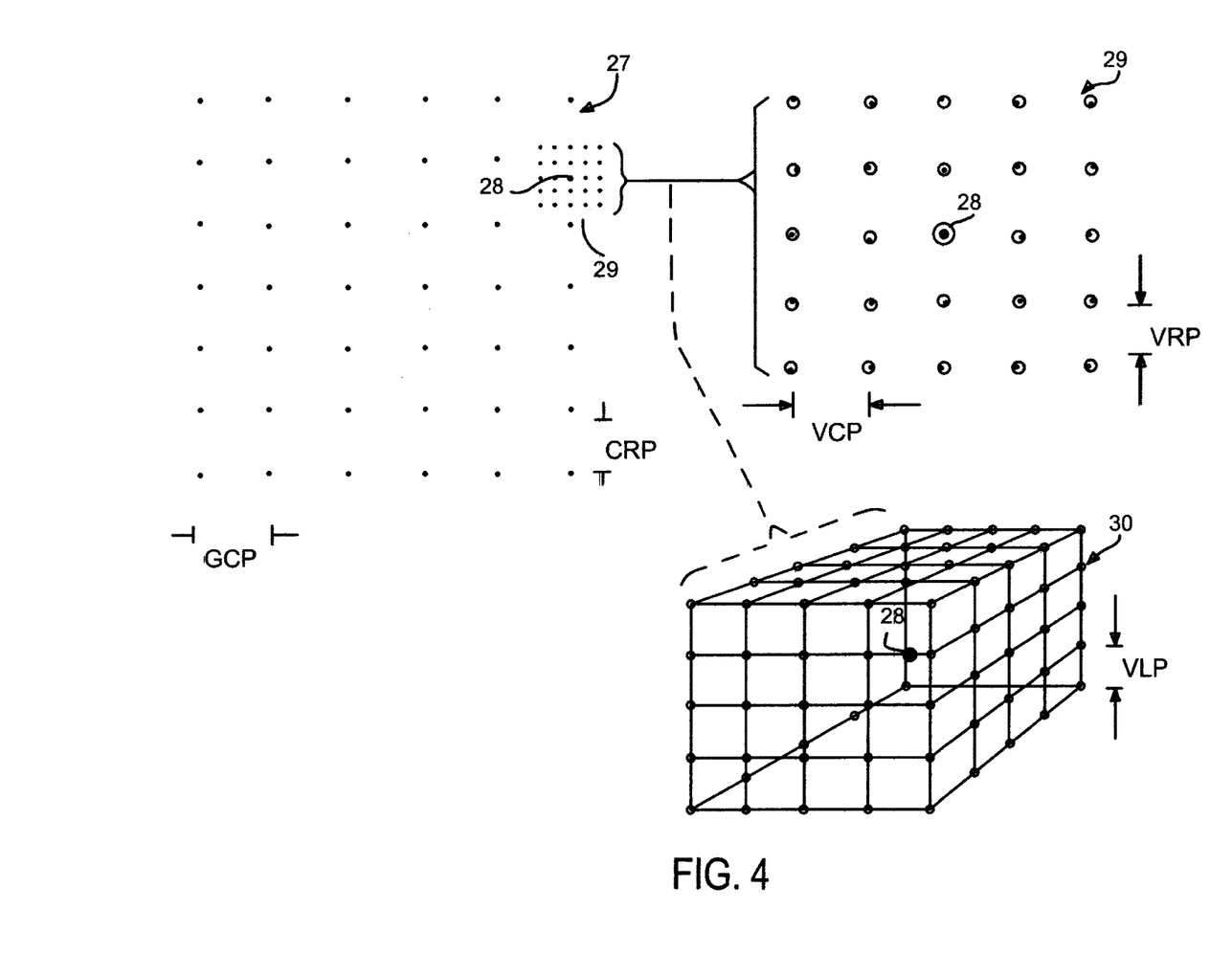
FIG. 4 is a map of grid pattern variations.
Figure 5:
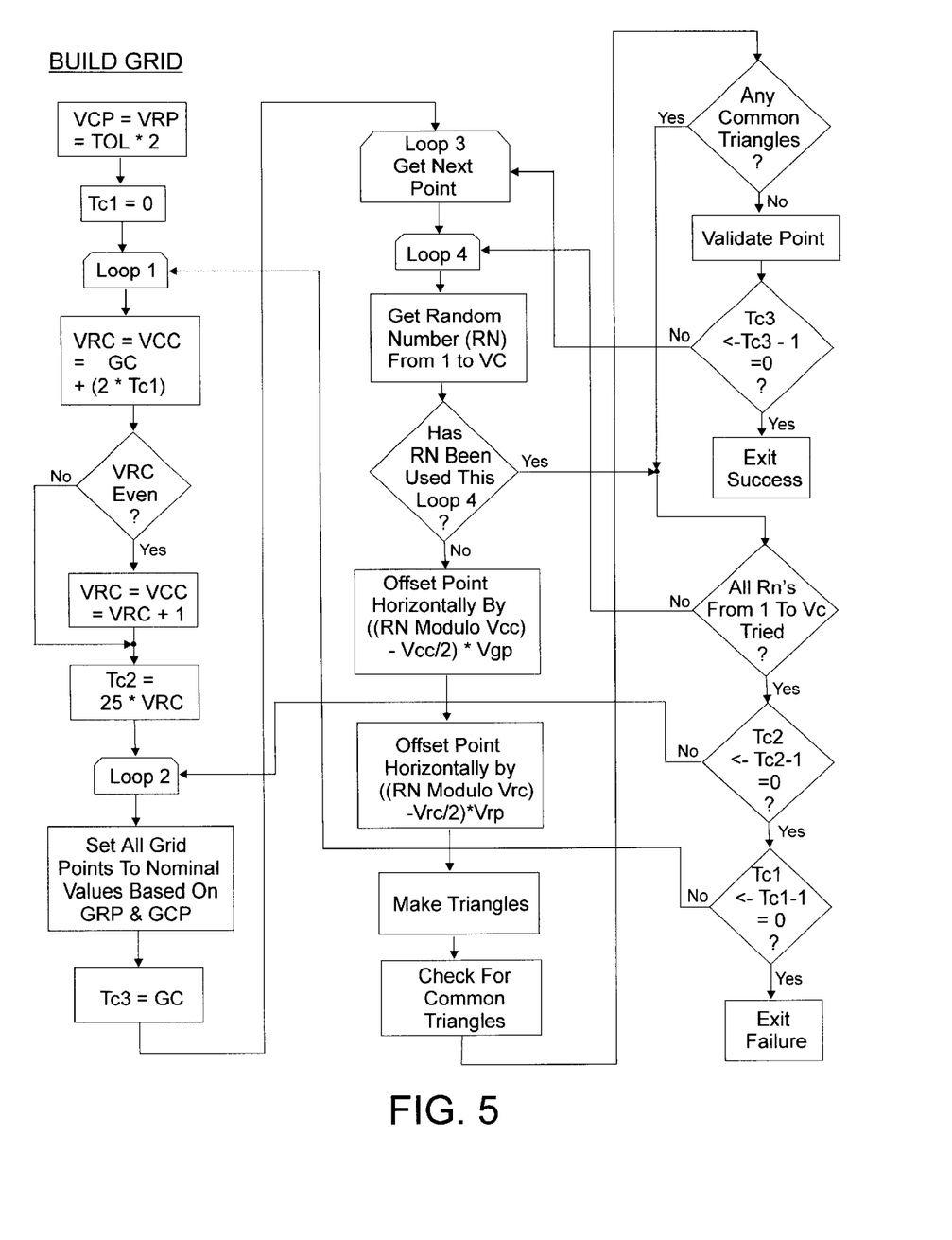
FIGS. 5–9 are flow diagrams of a computer program used in the creation of the reference pattern.
Figure 6:
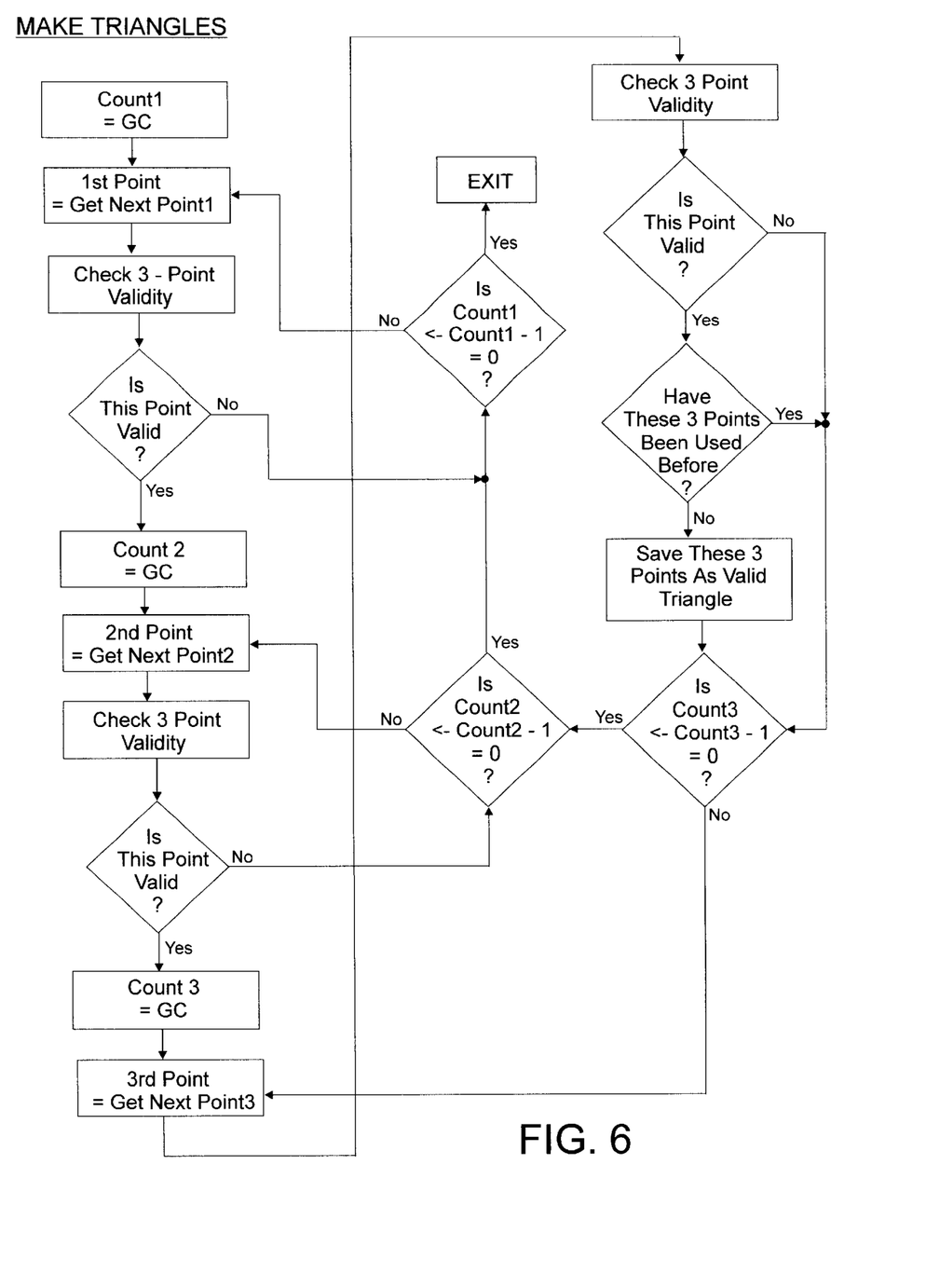
Figure 7:
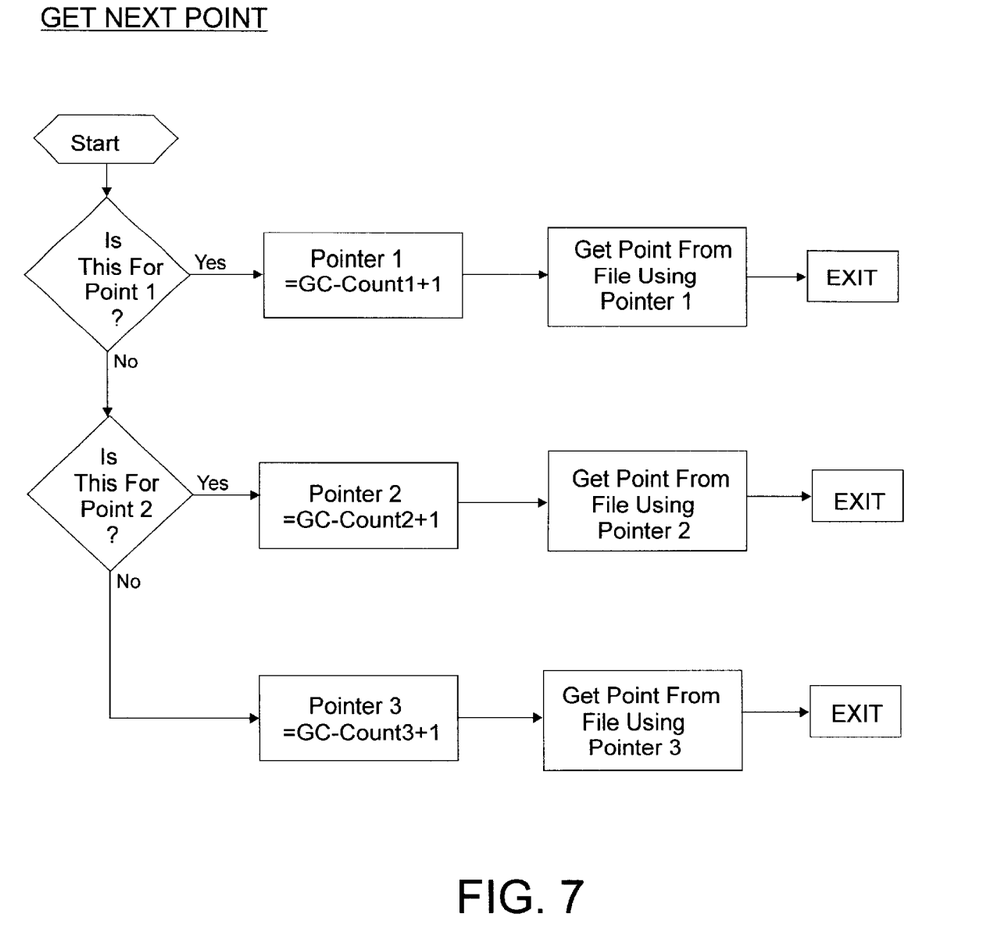
Figure 8:
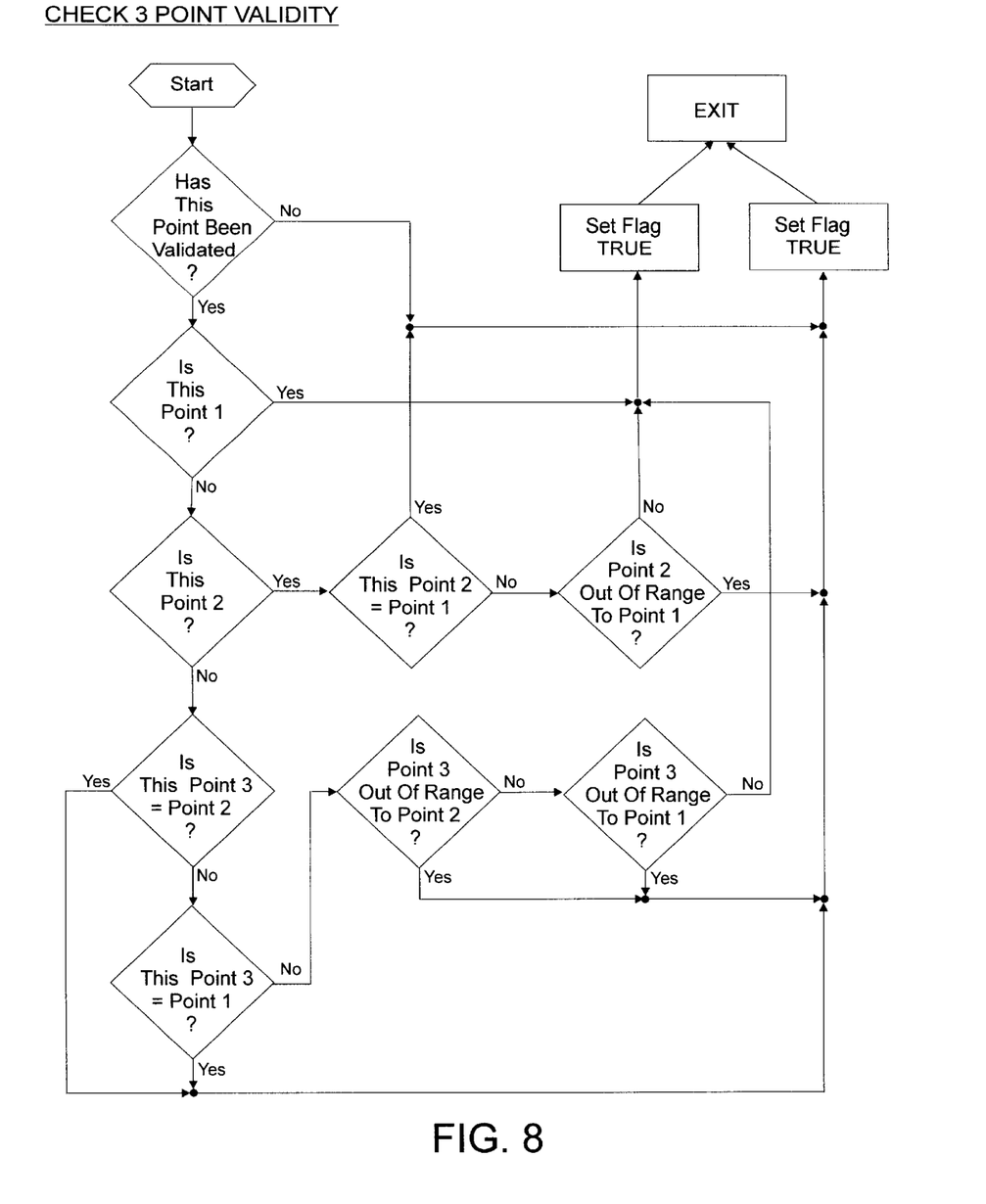
Figure 9:
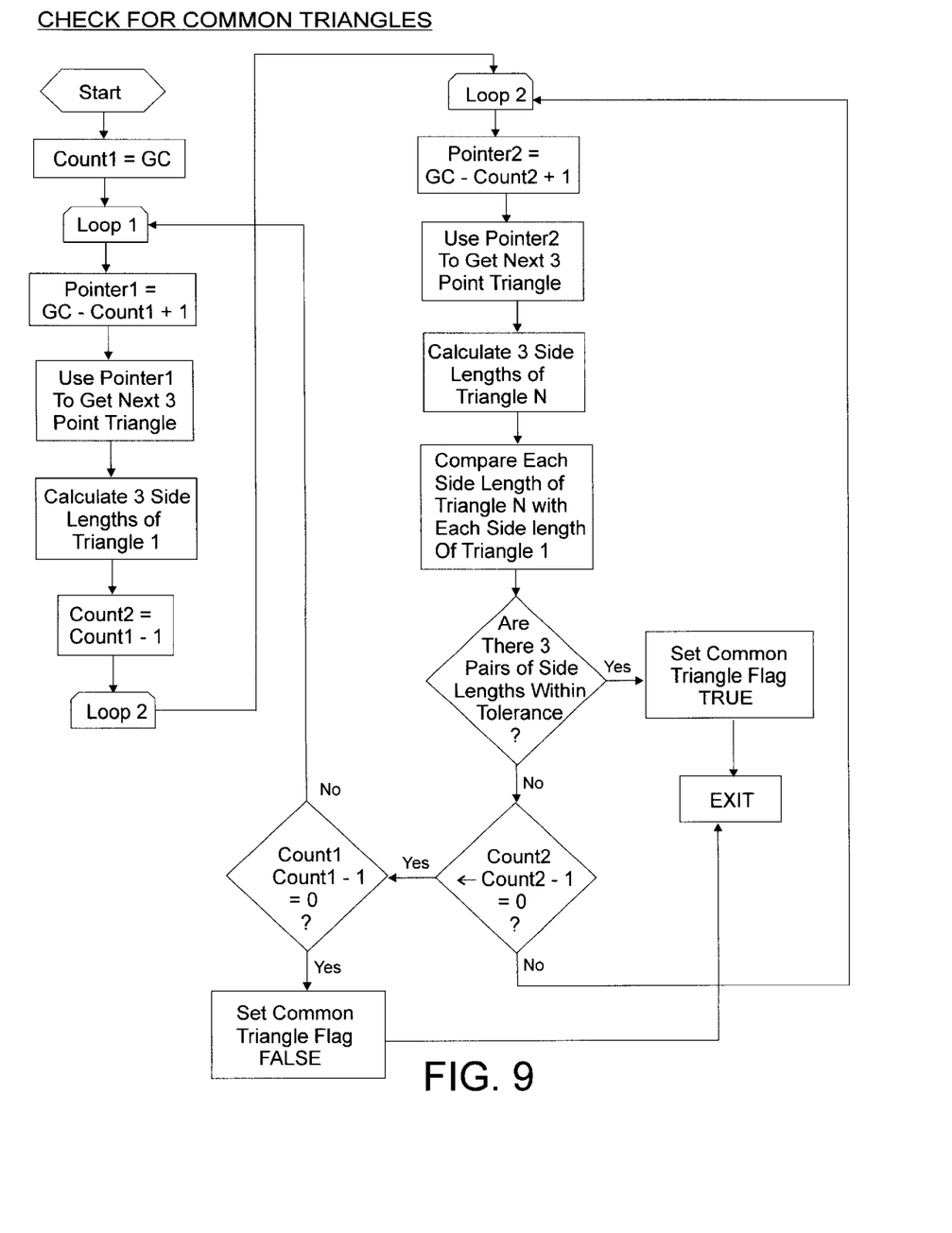

Let us assume that the task is to distort, according to the invention, a regular coordinate grid pattern 27 having a total reference point Grid Count (GC) of forty-two arranged into a Grid Row Count (GRC) of seven and a Grid Column Count (GCC) of six as shown in FIG. 4. Let us further assume that each point 28 will be allowed to deviate from its normal position within a surrounding planar variation array 29 having a Variation Row Count (VRC) of five, and a Variation Column Count (VCC) of also five. Let us further assume that the normal reference grid has a column spacing or Grid column Pitch (GCP) which is equal to the spacing between rows or its Grid Row Pitch (GRP).

The distorted position of all reference points can be obtained by use of a computer program based upon the flow diagrams illustrated in FIGS. 5–8, given GCP, GRP, GCC, and GRC, wherein TOL represents the tolerance available for installing each reference point slab, RN signifies a random number, and TC1, TC2, TC3 . . . corresponds to trial counts 1, 2, 3 etc. . . . .

If the reference point variation is to be achieved within a cubic sub-array or range 30, an additional parameter, Variation Level Pitch (VLP) must be used, and preferably set at VRP times two.

After setting the variation pitches, and entering the given parameters, the points of a linear grid are established. Each point beyond the origin is then offset by a random amount. All possible triangles including that point are checked against all previously stored triangles to assure that no two of these triangles are symmetrical. This process is repeated as often as necessary to form a unique triangle unmatched throughout the grid.

FIGS. 6–9 illustrate the construction, validation and storage of each point in all possible triangles after the offsetting of a reference point in the grid, using a planar variation sub-array.

Only triangles that are within the defined proximity (i.e., within the sub-array containing this particular point or within a maximum vertical, horizontal or diagonal distance or range therefrom) are examined.

Figure 10:
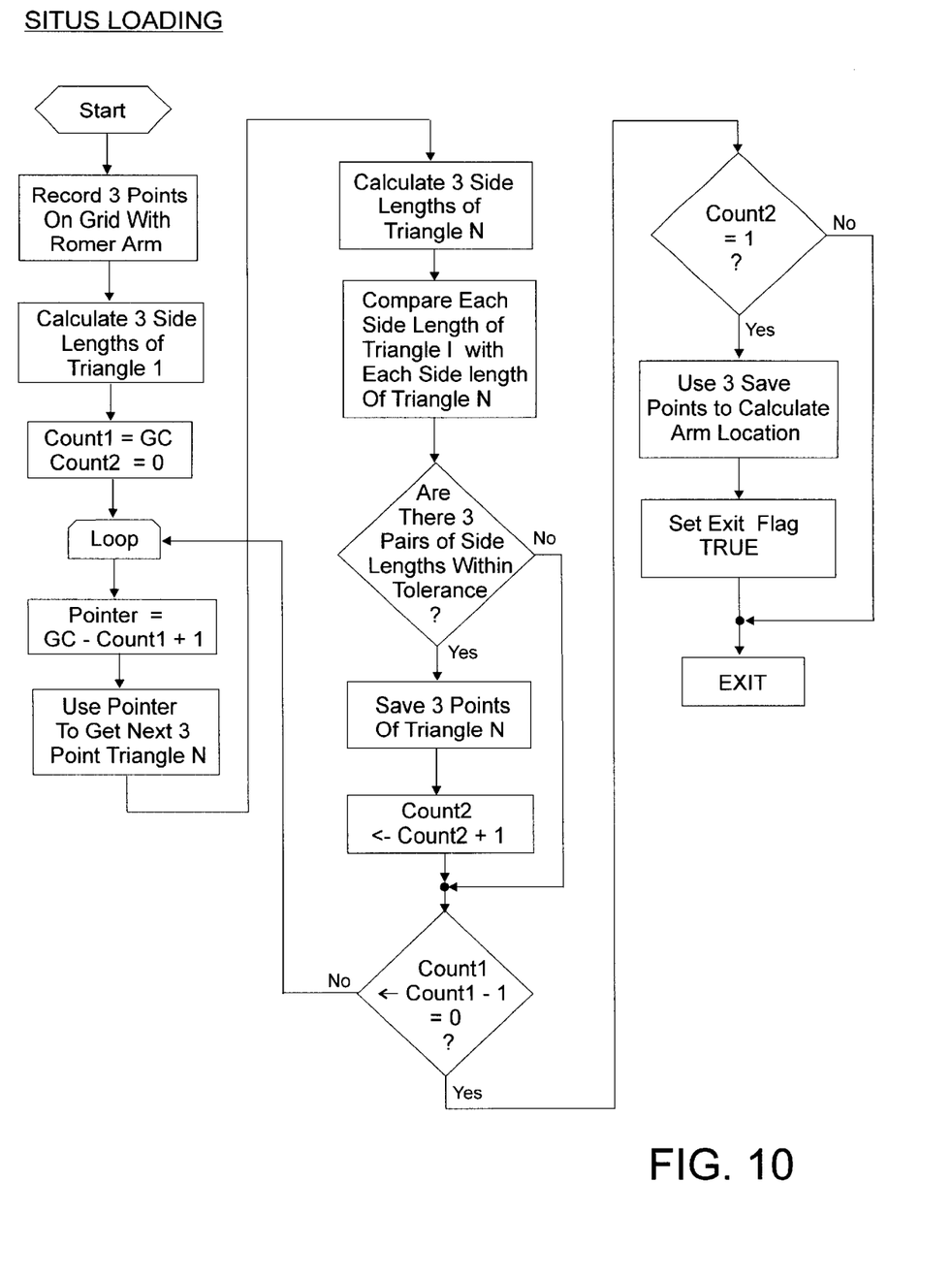
FIG. 10 is a flow diagram of a computer program using the self-loading pattern.

Once the assemblage of distorted coordinate reference points has been installed, it may be put into practice by using a computer program illustrated by the flow diagram of FIG. 10.

While the preferred embodiment of the invention has been described, modifications can be made and other embodiments may be devised without departing from the spirit of the invention and the scope of the appended claims.

What is claimed is:

1. An assemblage of benchmark reference points distributed and applied across a space, wherein a triangle defined by a first set of three of said points located within a defined proximity from one another is not symmetrical to another triangle defined by any second set of three of said points located within said defined proximity.

2. The assemblage of claim 1 which comprises an array of said points distributed along a distorted grid pattern of rows and columns;

wherein said points are not exactly aligned along linear and orthogonal grid lines; and wherein said defined proximity consists of reference points defining a two-by-two sub-array.

3. The assemblage of claim 2 which further comprises:

a cubic array of said points distributed along orthogonally-oriented layers of distorted grid patterns of rows and columns; and wherein said defined proximity consists of reference points defining a three-by-three sub-array.

4. The assemblage of claim 2, wherein said reference points comprise benchmarks positioned over a support surface.

5. The assemblage of claim 4, wherein said support surface comprises a floor.

6. The assemblage of claim 4 in combination with a swiveling spatial coordinate measuring arm positioned at a situs; and wherein said arm has a given reach, and comprises a probe tip.

7. The combination of claim 6, wherein said benchmarks comprise convex conical cavities shaped and dimensioned to nest said probe tip, and having axes defining said reference points.

8. The combination of claim 7, wherein said assemblage comprises at least one of said sub-arrays within said arm reach, each reference point in said sub-array being defined by one of said cavities.

9. The combination of claim 8 which further comprises means for automatically calculating the coordinates of reference points in said sub-arrays when said probe tip is successively inserted into said cavities.

10. The combination of claim 9 which further comprises means for deriving the coordinates of said situs from three of said reference point coordinates.

11. The assemblage of claim 1, wherein the distances and orientations from a situs within said space to said first set of points differ from the distances and orientations from said situs to said second set of points;

whereby location coordinates of said situs can be derived from its distances and orientations in relation to any three of said points located within said proximity to one another.

12. The assemblage of claim 11 which comprises an array of said points distributed along a distorted grid pattern of rows and columns; and wherein said defined proximity consists of reference points defining a two-by-two sub-array.

13. The assemblage of claim 11 which comprises a cubic array of said points distributed along orthogonally oriented layers of distorted grid patterns of rows and columns;

wherein said points are not exactly aligned along linear and orthogonal grid lines; and wherein said defined proximity consists of reference points defining a three-by-three sub-array.

14. The assemblage of claim 12, wherein said reference points comprise benchmarks positioned over a support surface.

15. The assemblage of claim 14, wherein said support surface comprises a floor.

16. The assemblage of claim 14 in combination with a swiveling spatial coordinate measuring arm positioned at said situs; and wherein said arm has a given reach, and comprises a probe tip.

17. The combination of claim 16, wherein said benchmarks comprise convex conical cavities shaped and dimensioned to be engaged by said probe-tip, and having axes defining said reference points.

18. The combination of claim 17, wherein said assemblage comprises at least one of said sub-arrays within said arm reach, each reference point in said sub-array being defined by one of said cavities.

19. The combination of claim 18 which further comprises means for automatically calculating the coordinates of reference points in said sub-arrays when said probe tip is successively inserted into said cavities.

20. The combination of claim 19 which further comprises means for deriving the coordinates of said situs from three of said reference point coordinates.

21. In a computerized spatial measurement system in which a movable measuring instrument is used in relation to a global coordinate pattern of fixed benchmark reference points, wherein the position of the instrument must be entered into an associated data processor after each displacement of said instrument, the improvement which comprises distributing said reference points along distorted grid lines wherein said points are not exactly aligned along linear and orthogonal grid lines and whereby said position is automatically entered into said data processor by measuring the locations of three of said reference points which can be joined to form a triangle.

22. The improvement of claim 21, wherein said step of distributing comprises spatially offsetting said reference point from linear grid pattern locations by amounts sufficient to avoid the possibility that a triangle defined by a first set of three of said points located within a defined proximity from one another might be symmetrical with another triangle defined by a second set of three of said points located within said defined proximity from another.

23. The improvement of claim 21, wherein said defined proximity consists of a reference points defining a two-by-two sub-array.

24. The improvement of claim 21, wherein said defined proximity consists of a reference points defining a three-by-three sub-array.

25. The improvement of claim 21, wherein said step of spatially offsetting comprises displacing at least one of said points within a two-dimensional variation range.

26. The improvement of claim 21, wherein said step of spatially offsetting comprises displacing at least one of said points within a three-dimensional variation range.

* * * * *